(12) United States Patent
Hayber

(10) Patent No.: US 8,314,973 B2
(45) Date of Patent: Nov. 20, 2012

(54) METHOD AND APPARATUS FOR DYNAMIC PRINTER PERFORMANCE TUNING USING BAYESIAN ANALYSIS

(75) Inventor: Kenneth David Hayber, Fountain Valley, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 140 days.

(21) Appl. No.: 12/791,274

(22) Filed: Jun. 1, 2010

(65) Prior Publication Data
US 2011/0292415 A1 Dec. 1, 2011

(51) Int. Cl.
*G06K 15/00* (2006.01)
*G06F 3/12* (2006.01)
*H04N 1/40* (2006.01)
*H04N 1/46* (2006.01)

(52) U.S. Cl. ............... 358/3.08; 358/3.09; 358/3.13; 358/3.14; 358/3.01; 358/504

(58) Field of Classification Search .......... 358/1.13, 358/1.14, 1.15, 1.9, 3.01, 3.21, 3.24, 406, 358/504
See application file for complete search history.

(56) References Cited

U.S. PATENT DOCUMENTS

| | | | | |
|---|---|---|---|---|
| 5,327,526 | A * | 7/1994 | Nomura et al. | 358/1.16 |
| 6,084,688 | A * | 7/2000 | Stumbo et al. | 358/1.17 |
| 6,115,131 | A | 9/2000 | Payne | |
| 7,072,052 | B1 * | 7/2006 | Tanahashi et al. | 358/1.1 |
| 2003/0231330 | A1 * | 12/2003 | Westervelt et al. | 358/1.13 |
| 2004/0061892 | A1 * | 4/2004 | Ferlitsch | 358/1.15 |
| 2008/0007754 | A1 * | 1/2008 | Torii | 358/1.12 |
| 2009/0067004 | A1 * | 3/2009 | Mazur | 358/1.17 |
| 2009/0225369 | A1 * | 9/2009 | Gordon et al. | 358/1.18 |
| 2009/0244593 | A1 | 10/2009 | Prebble | |
| 2011/0292409 | A1 * | 12/2011 | Waarsing et al. | 358/1.5 |

\* cited by examiner

*Primary Examiner* — Twyler Haskins
*Assistant Examiner* — Jonathan Beckley
(74) *Attorney, Agent, or Firm* — Chen Yoshimura LLP

(57) ABSTRACT

A method and a printing implementing the method for dynamic printer performance tuning. The method includes the steps of processing a page to be printed by a printer description language interpreter to generate a Display List, selecting tuning parameters from the Display List data, analyzing the tuning parameters by a Bayesian analyzer to obtain a score for each tuning parameter, and based on the score of each tuning parameter, adjusting rendering settings of the tuning parameters for printing the page. The steps of training the Bayesian analyzer includes creating a set of training pages, rendering each page to determine best performance settings for each tuning parameter, grouping the pages based on tuning parameter settings, generating Display List data of each page, rendering the training pages in each group to compile training data that are saved for future printing jobs.

14 Claims, 5 Drawing Sheets

METHOD AND APPARATUS FOR DYNAMIC PRINTER PERFORMANCE TUNING USING BAYESIAN ANALYSIS

BACKGROUND OF THE INVENTION

1. Field of the Invention

This invention relates generally to methods and apparatus for printer performance tuning and in particular, it relates to methods and apparatus for printer performance tuning based on statistical analysis of page contents.

2. Description of Related Art

Page Description Language (PDL) interpreters and renderers are widely used in modern printers from desktop publishing to print shop production. For example, PostScript (PS) is an object-based PDL primarily for printing documents on laser printers, but it has also been adapted to produce images on other types of printers. In a printer using PostScript language, the PostScript language is ran by an interpreter, also known as a raster image processor ("RIP"), to render an image. Examples of PostScript language interpreters and renderers include Adobe's Configurable Postscript Interpreter (CPSI), Aladdin®'s GhostScript, etc. Other examples of PDLs include HP®'s Printer Control Language (PCL), Adobe®'s Portable Document Format (PDF), Microsoft®'s XML Paper Specification (XPS), etc., PDL interpreters and renderers have many possible settings that may affect a printer's performance. Some of these settings may be ideal for certain print jobs while being less than ideal for other print jobs. However, finding the best set of tuning parameters for all possible settings is an act of compromising among different objectives and guessing what a typical job will contain (e.g., text, image, or vector graphics).

While printer performance may be somewhat "manually" tuned by adjusting the settings of the interpreter on the fly to find the best performance for a particular job, it is not very practical in many cases. For example, a "manual" tuning may be achieved by first rendering some pages using default settings of the interpreter and collecting some data about the content and performance of those pages, then making some adjustment and printing more pages to see whether the performance has increased or decreased. This may work if the print job is very large and consisted of very similar pages, such that performance tuning that works well for the initial pages at the beginning of the print job will also be expected to work well for the remaining pages in the print job. Unfortunately this is often not the case, and the manual process of repeated printing, measuring, adjusting, printing, measuring, readjusting . . . is very labor intensive and time consuming before best performance settings may be found. Moreover, the problem with "manual" tuning is that it is a "static" tuning process that applies the same result for all pages of all printing jobs. It is not a dynamic process and it is virtually impossible to find a "one-setting-fits-all" solution.

It would be preferable that instead of the "manual" process described above, printer performance tuning can be a dynamic process based on a "self-learning" capability of a PDL interpreter, where the interpreter can learn and remember what settings work best for each page based on the content of the page, and applies this "self-learning" process while each page is being processed rather than after some set of pages has already been rendered.

The concept of self-learning and adjusting based on statistical data has been applied in other applications using the Bayes' theorem. For example, in email spam filtering technologies, "Bayesian spam filtering" which uses the Bayesian analysis has become a popular mechanism to distinguish illegitimate, or "spam", emails from legitimate emails.

Bayesian spam filtering is based on the statistical finding that particular words have particular probabilities of occurring in spam emails and in legitimate emails. For example, the word "refinance" may have a high occurrence in spam emails but a very low occurrence in other emails. An email filter would not know these probabilities in advance, and must first be trained so it can build up the knowledge. To train the email filter, a user usually first needs to manually indicate whether a new email is spam or not. For all words in each training email, the filter will adjust the probabilities that each word will appear in spam or ham emails in its database. For example, Bayesian spam filters will typically have learned a very high spam probability for the word "refinance", but a very low spam probability for words seen only in legitimate emails, such as the names of friends and family members.

After training, the word probabilities (also known as "likelihood functions") are used to compute the probability that an email with a particular set of words in it belongs to either the spam or legitimate email category. Each word in the email contributes (or only the most interesting words contribute) to the email's spam probability. This contribution is called the "posterior probability" and is computed using Bayes' theorem. Then the email's spam probability is computed over all words in the email, and if the total exceeds a certain threshold (e.g. 95%), the filter will mark the email as a spam.

The initial training can usually be refined when wrong judgments from the software are identified (false positives or false negatives) when the user manually changes an email from the spam category to the legitimate email category or vice versa, which allows the filter software to dynamically improve its accuracy and adapt to new development in the spam emails.

It would be preferable to have a method of performance tuning where the printer can learn and remember what settings work best for each page based on the page content, where the process can be applied while each page is being processed rather than after some set of pages has already been rendered, and also the tuning data can be saved from one job and applied to future jobs.

It would also be preferable to have an improved printer performance tuning method that uses Bayesian analysis, which could provide a dynamic performance tuning based on statistical analysis of page contents.

SUMMARY

The present invention is directed to a method and apparatus for printer performance tuning using Bayesian analysis.

An object of the present invention is to provide a dynamic performance tuning method, and a printer implementing the method, that allows a printer's PDL language interpreter to learn best performance tuning data for each page based on page content while each page is being processed by using Bayesian analysis and applied the best settings to process the print page, where the saved tuning data from one job can also be applied to future jobs.

The present invention is applicable to various PDL such as PS, PCL, PDF, XPS, etc. and other languages where a Display List (DL) or its equivalent may be created. It may be possible in some PDL languages to apply the prevent invention method directly to the original PDL (source file) without generating any intermediate format. The important aspect is to be able to separate each page and to determine which types of objects (and how many, how big, etc.) appear on each page. This may be difficult for some PDLs such as PS so generating a Display List (DL) and then applying the analysis on the DL is more effective. For other PDLs such as PCL it is easier to get the page object information from the PDL so generating a DL becomes unnecessary.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for dynamic printer performance tuning. The method includes the steps of processing a page to be printed by a printer description language (PDL) interpreter/renderer to generate a Display List (DL) of the page, selecting attributes of page objects that affect printer performance from the Display List data, analyzing the tuning parameters of the PDL interpreter/renderer to obtain performance data for each tuning parameter, and based on the performance data of each tuning parameter, adjusting rendering settings of the tuning parameters for printing the page.

The dynamic printer performance tuning method also include a training process which further includes the steps of creating a set of training pages to be analyzed by the Bayesian analyzer, rendering each page to determine best performance settings for each tuning parameter, grouping the pages based on tuning parameter settings, generating Display List data of each training page, rendering the training pages in each group to compile training data for the tuning parameter settings, and saving the training data.

In another aspect, an embodiment of the present invention provides a printer capable of providing dynamic performance tuning. The printer has a control unit which includes a memory for storing computer readable program code, an image processing unit coupled to the control unit, a print engine controlled by the control unit, and a processor for executing the code to control the printer, where the computer readable program code is configured to cause the printer to execute the above described process for dynamic printer performance tuning, which includes the steps of processing a page to be printed by a printer description language (PDL) interpreter/renderer to generate a Display List (DL) of the page, selecting attributes of page objects that affect printer performance from the Display List data, analyzing the tuning parameters of the PDL interpreter/renderer to obtain performance data for each tuning parameter, and based on the performance data of each tuning parameter, adjusting rendering settings of the tuning parameters for printing the page, and further includes a process of training the Bayesian analyzer, which in turn further includes the steps of creating a set of training pages to be analyzed by the Bayesian analyzer, rendering each page to determine best performance settings for each tuning parameter, grouping the pages based on tuning parameter settings, generating Display List data of each training page, rendering the training pages in each group to compile training data for the tuning parameter settings, and saving the training data.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
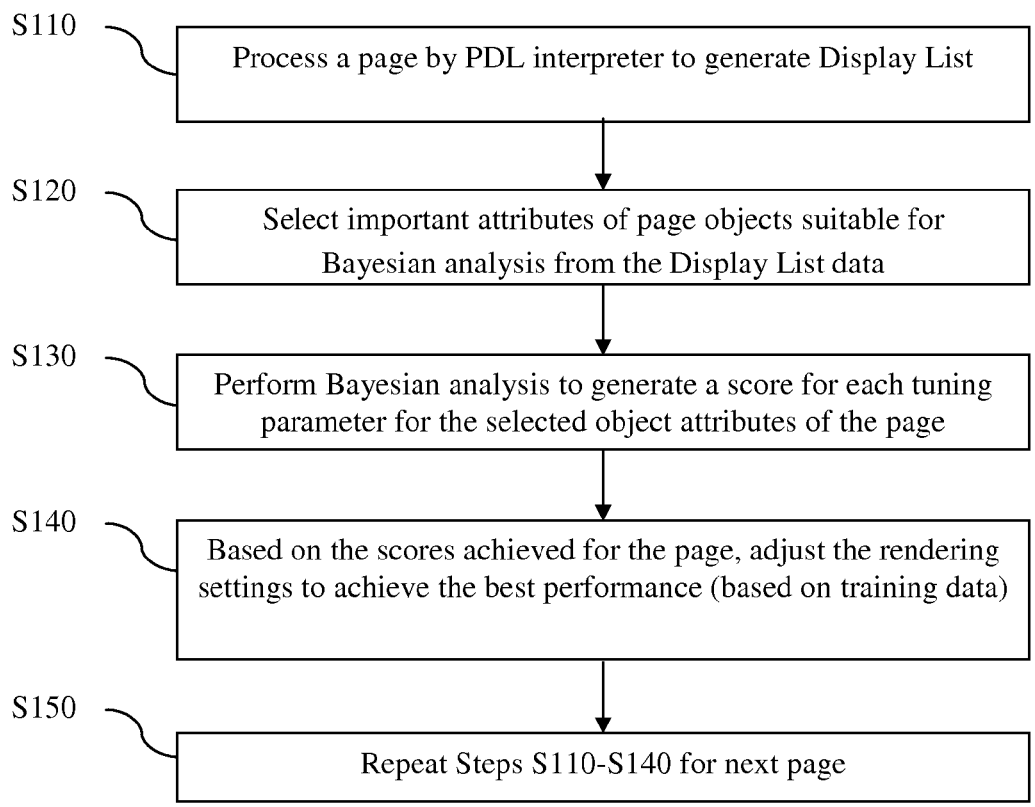
FIG. 1 is a flow chart illustrating an exemplary printing process that applies the dynamic performance tuning using Bayesian analysis, according to an embodiment of the present invention.

Embodiments of the present invention provide a method for dynamic printer performance tuning using Bayesian analysis.

An embodiment of the present invention method may be implemented by a process based on statistical analysis of page contents. Most PDL interpreters employ a program known as "Display List processing". This program consists of a front-end processor which reads the page description data stream and writes a file or other data object that contains Display List instructions. These instructions are very primitive drawing commands and data that can easily be manipulated and processed efficiently. The second part of the program is the back-end renderer which reads the Display List data and produces a bitmap that is then sent to the hardware (e.g. print engine) for actual printing on paper or other media.

One of the purposes and advantages of a Display List is that the data can be analyzed based on page content. This is typically used to sort the data into "Bands" so that the memory requirements for the renderer is reduced, where each band represents a corresponding portion of the Display List (e.g., a sublist). For example, a typical band might correspond to a half-inch vertical strip of a page, though it highly depends on the allocated memory capacity and/or the required resolution of the bitmap image. Another way to sort is using "Object Type" data in the Display List to render different object types using specific rules (e.g. text may be rendered differently than image or vector objects).

The Display List contains objects which have various attributes. Some of these attributes may be relevant to performance, some may not. But probably all objects in a Display List will affect performance. So the analysis is focused on objects in the page content, and irrelevant attributes are removed from the analysis. For example, if there are two bitmaps in the Display List and they have attributes such as size, location, color, then the location attribute would be ignored and but the size and color attributes would be used for the analysis. After ignoring location it may be that these two bitmaps become identical with regard to the other attributes. So for statistical analysis, it would be like the same objects are seen twice, rather than seeing two separate unique objects.

According to one embodiment of the present invention method, the Display List data is analyzed in order to determine ideal performance characteristics and tuning parameters. The Display List data is analyzed by using Bayesian analysis. Bayesian systems do not need to know the details of the data being analyzed, because such systems are trained by feedback. By applying Bayesian analysis to Display List data, each page can be classified according to its content and ideal performance tuning parameters can be applied to the processing of that page.

Many attributes of a data object in a Display List may be involved in a performance tuning process, e.g., Band Height or Width, Rendering Direction, Number of Threads, etc. Each of these attributes may have multiple settings and changing these settings may have a noticeable effect on the rendering of a print job. Some of these attributes are suitable for Bayesian analysis (e.g., Object Type, Size, Color, Transparency, Pattern, Orientation, etc.). These suitable attributes need to be extracted and used during Bayesian analysis to determine ideal settings for each of the various tuning parameters. These tuning parameters need to be selected in a way that preserves relevant data, while excluding irrelevant information.

Referring to FIG. 1, there is illustrated an exemplary printing process that applies the dynamic performance tuning using Bayesian analysis, according to an embodiment of the present invention. First, each page to be printed is processed by the PDL interpreter, which generates a Display List for each processed page (step S110). (Normally the Display List for each page is then prepared for rendering of the page by sorting the Display List data by Band order or some other order. However, this step is optional and not a relevant step of the present invention process). Next, a group of important attributes of page contents suitable for Bayesian analysis is selected and extracted from the Display List data (step S120). Bayesian analysis is performed on the tuning parameters of the selected object attributes (for example, the size, color and orientation of an image object on the page), which generates a score for each tuning parameter (step S130). Based on the scores achieved for the page, the rendering settings of the page is adjusted to achieve the best performance (based on training data) (step S140). Alternatively each score may be compared to a preset threshold. If the score is above the threshold, then the setting is applied in the rendering. The above steps are then repeated for any subsequent page(s) (step 150).

In the process described above, Bayesian analysis is applied to each tuning parameter of a page, not each attribute or object in the Display List of the page. Since there may be multiple tuning parameters that affect the performance of rendering of the page, we need to know the best rendering setting for each tuning parameter. So a score for each tuning parameter needs to be generated. Therefore training data for each tuning parameter needs to be compiled and the Bayesian analysis must be performed using each set of the training data to arrive at these multiple scores.

Figure 2:
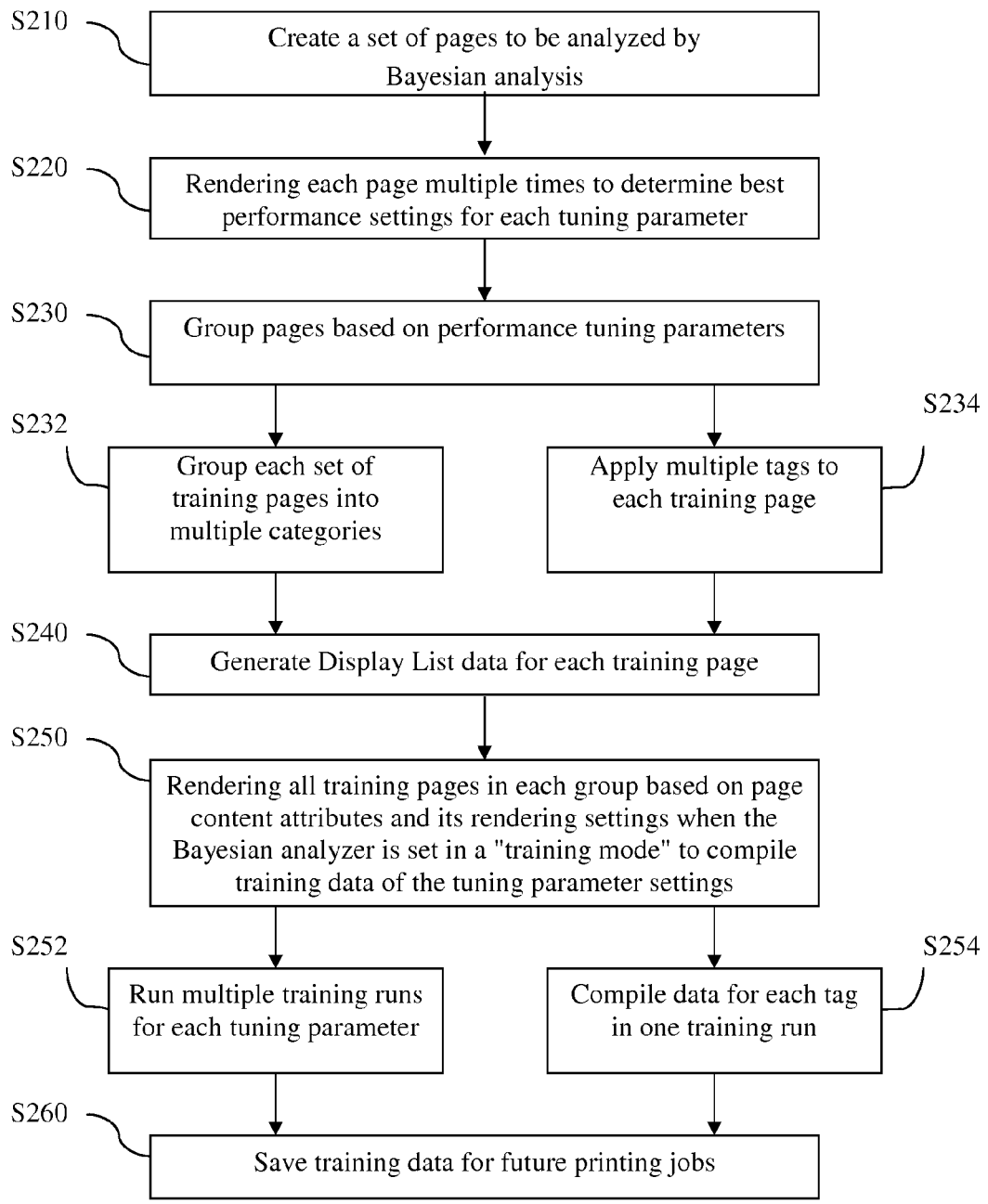
FIG. 2 is a flow chart illustrating an exemplary training process that applies the dynamic performance tuning using Bayesian analysis, according to an embodiment of the present invention.

Referring to FIG. 2, there is illustrated an exemplary training process for compiling training data to be used in the dynamic performance tuning using Bayesian analysis, according to an embodiment of the present invention. Initially a set of training pages to be analyzed is created (step S210). Each of these training pages is designed to have certain specific features that will help focusing on the adjustment of tuning parameters For example, some training page may have image rich content, while others may have text only content, and so on. Of course training pages may be created with any types of objects ((bitmap, text, vector, etc.) or their combination. Then the best performance settings for each tuning parameter need to be manually determined. This may be done by rendering each page multiple times and perform manual tuning to find best setting for each tuning parameter (step 220). For example, a training page may be first rendered using default attribute settings of the interpreter, and some data about the content and performance of the training page are collected; then some adjustment to the rendering settings can be made and the page can be rendered again to see whether the performance is improved. This process may need to be repeated until the best rendering setting may be found. For example, two tuning parameters may be "Multi-Threaded-Rendering" and "Band-Height", and their best performance setting may be "Multi-Threaded-Rendering=On", and "Band-Height=120".

Next, the training pages are grouped (or "tagged") based on which rendering settings are best for that page (step 230). These groups are based on each setting for each tuning parameter.

This can be done either by grouping each set of training data (job) into multiple "parameter and setting" categories (step 232), or by applying multiple tags to each job indicating which settings are best for that job (step 234). The use of a tagging system is only optional implementation which may provide optimization for the training process, however it is not a necessary step of the training process.

The Display List data for each training page needs to be generated so the training pages can be rendered through the training process (step 240). To apply Bayesian analysis to a dynamic performance tuning with multiple rendering settings, separate tables of statistics must be compiled during the training process. Hence for each group, all training pages in that group (with matching page content attributes and setting) are rendered when the Bayesian analyzer is set on a "training mode" (step 250). The training pages is either run multiple separate times (one for each parameter and each setting) (step 252), or run in one time with a tagging system where training data can be compiled for each tag (which corresponds to a tuning parameter and its setting) (step 254). Again, the use of a tagging system is only optional implementation which may provide optimization for the training process, however it is not a necessary step of the training process. The tuning data is saved and accumulate over multiple pages, which can be used in the dynamic tuning process described earlier for future printing jobs (step 260). Of course the entire process can be repeated as needed to obtain and compile more training data.

It is not simple for the printer to automatically detect whether a given combination of job and its settings will print "fast" or "slow" without printing the same job multiple times with each setting and comparing the results, which would be unacceptable to the end-user to attempt to do so (because each print job would take a very long time). However, an exemplary process implementing the present invention method may provide a training mode that can be used by the user (as opposed to accepting the "factory default" training data) by providing examples of the user's typical jobs.

The methods described above may be implemented as a part of an interpreter or raster image processor (RIP), which may be a part of a printer, a computer, a print server, or any other suitable data processing system. It may be used to generate an image which may be utilized in any desired ways, such as to be printed on a printer, to be display on a display device, to be stored in a storage device, to be transferred to another device, etc.

Figure 3:
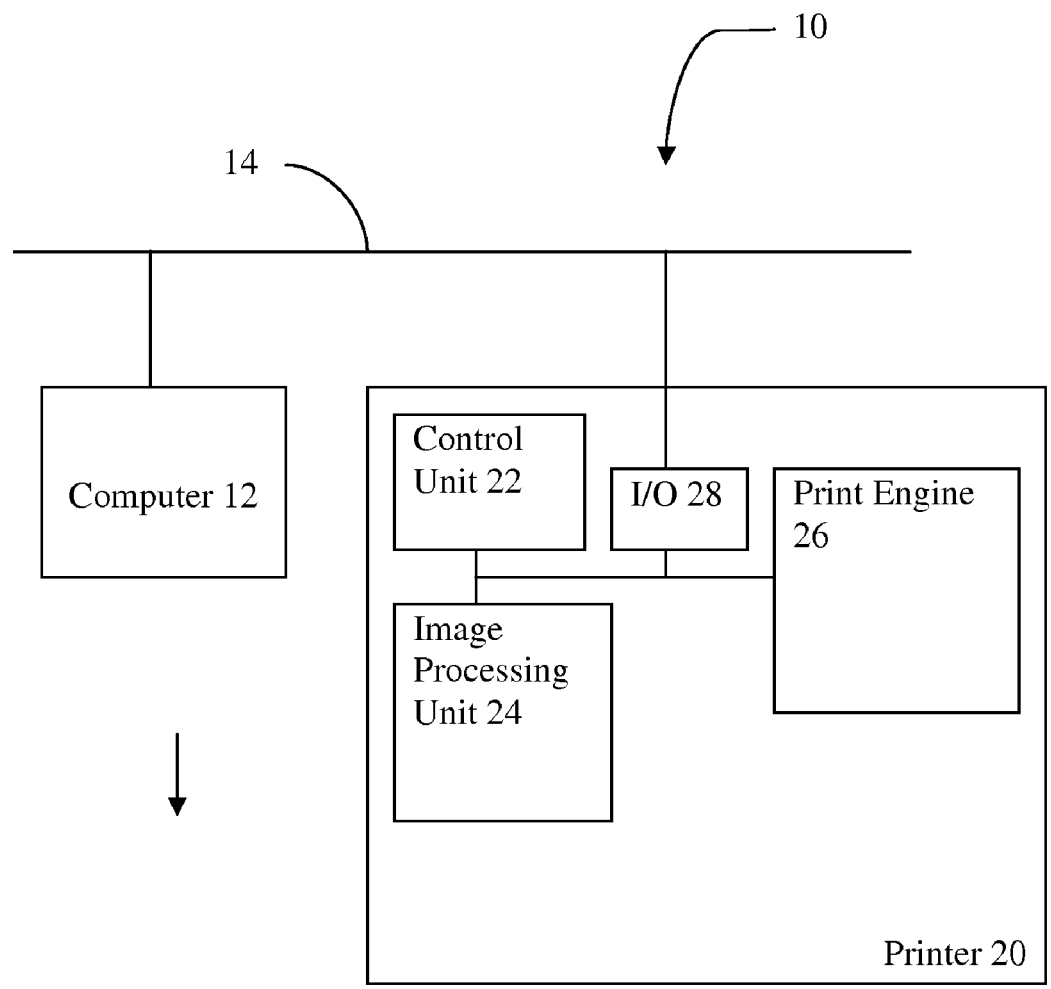
FIG. 3 is a schematic block diagram showing an exemplary printing system, according to an embodiment of the present invention.

Referring to FIG. 3, there is shown an exemplary printing system 10 according to an embodiment of the present invention. The printing system 10 includes a computer 12 and a printer 20 connected through a data communication line 14, such as a serial bus or cable, a local area network (LAN), a wide area network (WAN), other wired or wireless communication channels, and so on. Computer 12 has a structure commonly known in which a document to be printed is created using an application program, and upon a user's instruction, the document is sent to the printer 20 in a form of PDL data. Printer 20 schematically comprises a control unit 22, an image processing unit 24, a print engine 26, and an input/output (I/O) port 28. The control unit 22 comprises a central processing unit (CPU), a random access memory (RAM), and a read only memory (ROM). The CPU reads out various software programs stored in the ROM into the RAM to control the internal units and operations of printer 20. The CPU (and the RAM) may also act as the interpreter or RIP by executing software program, which is also stored in ROM. The PDL data sent from computer 12 is temporally stored in the RAM, and is rasterized by the CPU performing as the RIP. The image processing unit 24 carries out various image processing on rasterized image data under the control of the CPU 22, and sends the processed image data to the print engine 26. The print engine, which for instance employs the electrophotographic process, forms an image on a recording sheet based on the image data sent from the image processing unit 24. The I/O section accepts print data in the form of PDL from computer 12. The dynamic PostScript performance tuning method described above is carried out by the CPU in control unit 22 that acts as the interpreter or RIP, i.e., the CPU performs said method by executing software program that performing Bayesian analysis (a "Bayesian Analyzer").

Figure 4:
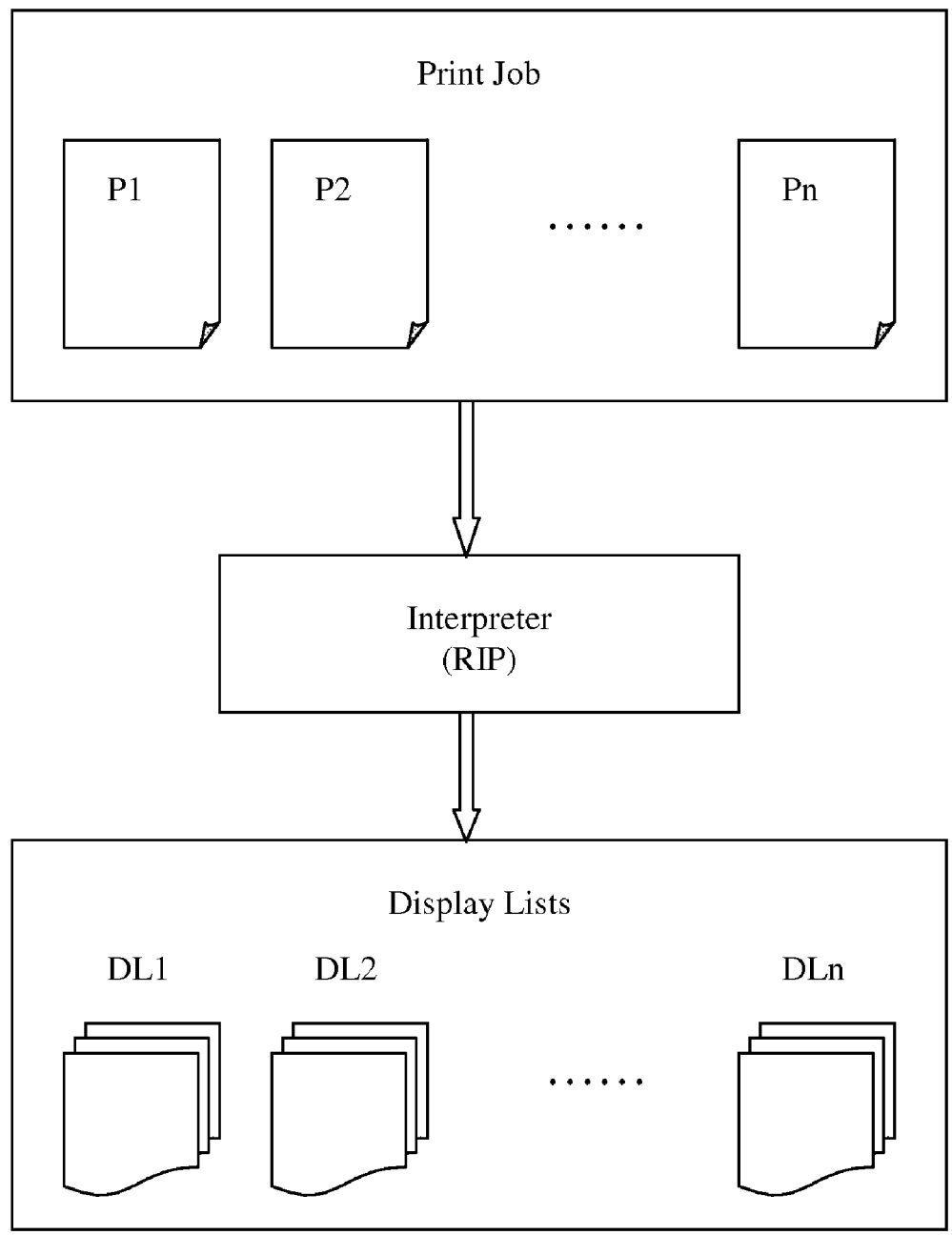
FIG. 4 is a partial flow chart illustrating an exemplary interpreting (RIP) process of the dynamic performance tuning method, according to an embodiment of the present invention.
Figure 5:
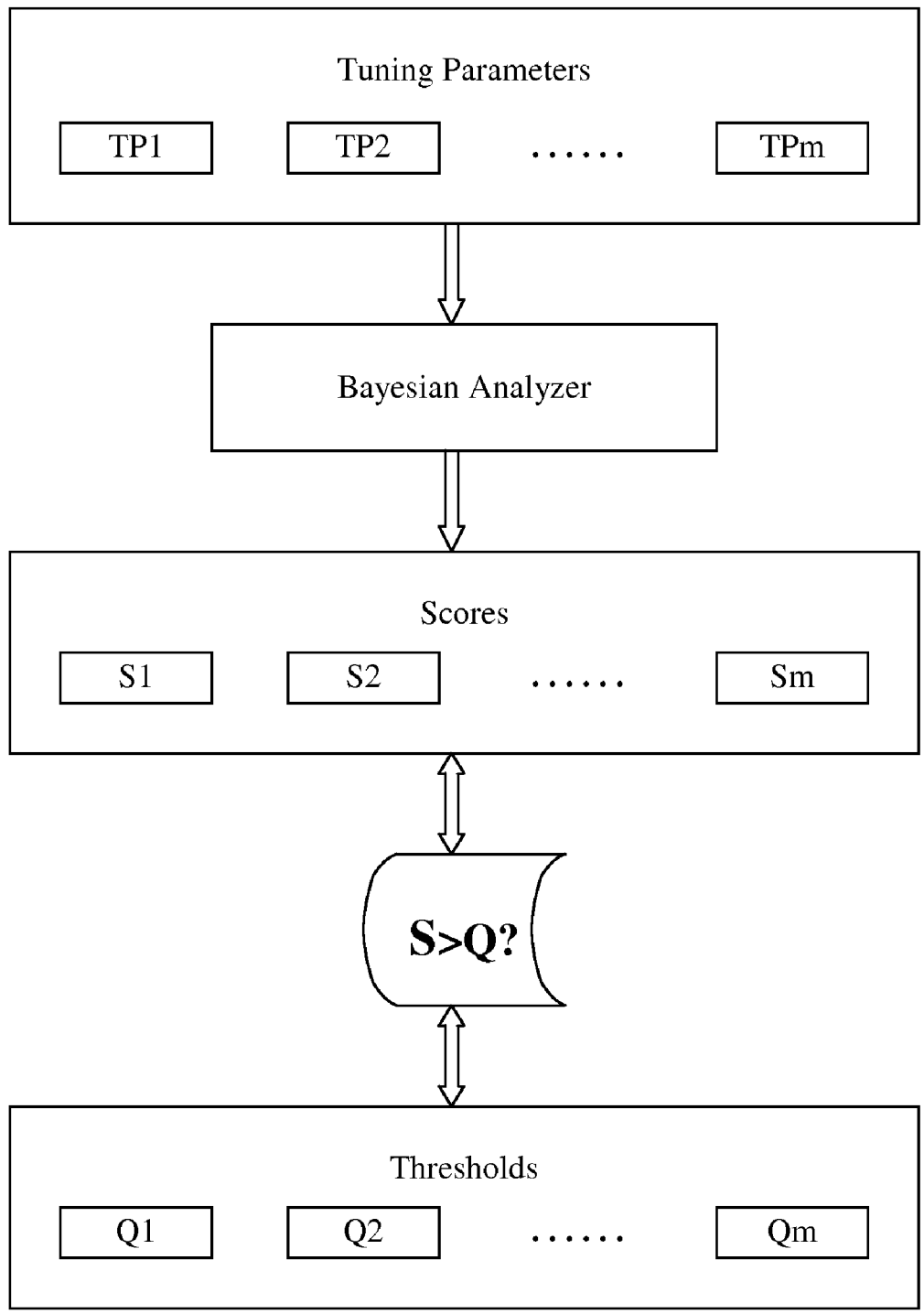
FIG. 5 is a partial flow chart illustrating an exemplary Bayesian analyzing process of the dynamic performance tuning method, according to an embodiment of the present invention.

The interpreter (RIP) program and the Bayesian Analyzer program may be stored in the ROM. When being executed by the CPU, they are read out from the ROM into the RAM for execution by the CPU. As shown in FIG. 4, when the interpreter (RIP) program is executed, Display Lists DL1, DL2, . . . DLn are generated from pages P1, P2, . . . Pn of the print job, respectively, where n is the number of pages in the print job. As shown in FIG. 5, when the Bayesian analyzer program is executed, scores S1, S2, . . . Sm are generated for tuning parameters TP1, TP2, . . . TPm respectively, where m is the number of selected tuning parameters extracted from the Display List data generated by the interpreter (RIP) from the pages of the print job.

As further shown in FIG. 5, when a preset set of thresholds Q1, Q2, . . . Qm are available, each score S may be compared to a corresponding threshold Q and if the score S is higher than the threshold Q (S>Q), then the corresponding rendering setting of a tuning parameter can be applied in the rendering to print the job.

The exemplary dynamic performance tuning method according to the present invention has many advantages. It provides a dynamic performance tuning based on statistical analysis of page contents. It also provides a printing process that applies the dynamic performance tuning using Bayesian analysis as well as a training process that applies the dynamic performance tuning using Bayesian analysis. It further provides a dynamic performance tuning method that allows a printer's PDL Interpreter to learn best performance tuning data for each page based on page content while each page is being processed. In addition, it allows the tuning data from one job be saved and applied to future jobs.

It will be apparent to those skilled in the art that various modification and variations can be made to the methods of the present invention without departing from the spirit or scope of the invention. Thus, it is intended that the present invention cover modifications and variations that come within the scope of the appended claims and their equivalents.

What is claimed is:

1. A method for dynamic printer performance tuning, comprising the steps of:
    processing a page to be printed by a printer description language (PDL) interpreter to generate a Display List of the page;
    selecting attributes of page contents that affect printer performance from the Display List data;
    analyzing PDL interpreter tuning parameters for the selected page content attributes to obtain performance data for each tuning parameter, wherein the step of analyzing the tuning parameters uses a Bayesian analyzer for performing Bayesian analysis on the tuning parameters;
    training the Bayesian analyzer; and
    based on the performance data of each tuning parameter, adjusting rendering settings of the tuning parameters for printing the page;
    wherein the step of training the Bayesian analyzer further comprises the step of:
        creating a set of training pages to be analyzed by the Bayesian analyzer;
        rendering each page to determine best performance settings for each tuning parameter;
        grouping the pages based on tuning parameter settings;
        generating Display List data of each training page;
        rendering the training pages in each group to compile training data for the tuning parameter settings; and
        saving the training data.

2. The method for dynamic printer performance tuning according to claim 1, wherein the performance data of the tuning parameter analysis is a score generated for each tuning parameter.

3. The method for dynamic printer performance tuning according to claim 2, further comprising the step of comparing the tuning parameter score to a preset threshold such that when the score is higher than the preset threshold the tuning parameter setting is used for rendering.

4. The method for dynamic printer performance tuning according to claim 1, further comprising the step of grouping each batch of training pages into multiple categories of attribute settings.

5. The method for dynamic printer performance tuning according to claim 4, further comprising the step of printing multiple training sets one for each category of tuning parameter settings.

6. The method for dynamic printer performance tuning according to claim 1, further comprising the step of applying multiple tags to each training page.

7. The method for dynamic printer performance tuning according to claim 6, further comprising the step of compiling tuning parameter data for each tag in one printing of all training pages.

8. A printer, comprising:
    a control unit which includes a memory for storing computer readable program code;
    an image processing unit coupled to the control unit;
    a print engine controlled by the control unit; and
    a processor for executing the code to control the printer, the computer readable program code being configured to cause the printer to execute a process for dynamic printer performance tuning;
    wherein the process comprising the steps of:
    processing a page to be printed by a printer description language (PDL) interpreter to generate a Display List of the page;
    selecting attributes of page contents that affect printer performance from the Display List data;
    analyzing PDL interpreter tuning parameters for the page content attributes to obtain performance data for each tuning parameter, wherein the step of analyzing the tuning parameters uses a Bayesian analyzer for performing Bayesian analysis on the tuning parameters;
    training the Bayesian analyzer; and based on the performance data of each tuning parameter, adjusting rendering settings of the tuning parameters for printing the page;

wherein the step of training the Bayesian analyzer further comprises the step of:
- creating a set of training pages to be analyzed by the Bayesian analyzer;
- rendering each page to determine best performance settings for each tuning parameter;
- grouping the pages based on tuning parameter settings;
- generating Display List data of each training page;
- rendering the training pages in each group to compile training data for the tuning parameter settings; and
- saving the training data.

9. The printer according to claim 8, wherein the performance data of the tuning parameter analysis is a score generated for each tuning parameter.

10. The printer according to claim 9, wherein the process further comprises the step of comparing the tuning parameter score to a preset threshold such that when the score is higher than the preset threshold the tuning parameter setting is used for rendering.

11. The printer according to claim 8, wherein said training step further comprises the step of grouping each batch of training pages into multiple categories of attribute settings.

12. The printer according to claim 11, wherein said training step further comprises the step of printing multiple training sets one for each category of tuning parameter settings.

13. The printer according to claim 8, wherein said training step further comprises the step of applying multiple tags to each training page.

14. The printer according to claim 13, wherein said training step further comprises the step of compiling tuning parameter data for each tag in one printing of all training pages.

* * * * *